(12) United States Patent
Hsu et al.

(10) Patent No.: US 12,505,161 B2
(45) Date of Patent: Dec. 23, 2025

(54) INSTANCE GRAPH DATABASE AND MODEL GRAPH DATABASE FOR DATA MANAGEMENT OF A PLATFORM

(71) Applicant: The Boeing Company, Chicago, IL (US)

(72) Inventors: Jack Hsu, Vancouver (CA); Bruce Wayne Perkins, Port Coquitlam (CA); Yu Sang Chik, Richmond (CA); Paul Bauermeister, North Vancouver (CA)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 17/937,239

(22) Filed: Sep. 30, 2022

(65) Prior Publication Data

US 2024/0111806 A1    Apr. 4, 2024

(51) Int. Cl.
*G06F 16/00* (2019.01)
*G06F 16/901* (2019.01)
*G06Q 40/06* (2012.01)

(52) U.S. Cl.
CPC ......... *G06F 16/9024* (2019.01); *G06Q 40/06* (2013.01)

(58) Field of Classification Search
CPC ..... G06F 16/9024; G06F 16/27; G06Q 40/06; G06Q 10/20
See application file for complete search history.

(56) References Cited

U.S. PATENT DOCUMENTS

| | | | |
|---|---|---|---|
| 10,564,993 B2 | 2/2020 | Deutsch et al. | |
| 2016/0103827 A1* | 4/2016 | Nguyen Manh | G06F 16/93 707/755 |
| 2019/0102478 A1* | 4/2019 | Wei | G06F 16/13 |
| 2019/0177008 A1* | 6/2019 | Floyd | G06F 3/048 |
| 2020/0110776 A1* | 4/2020 | Pollard | G06F 16/9024 |
| 2021/0279220 A1* | 9/2021 | Subramaniam | G06F 16/288 |
| 2022/0150124 A1* | 5/2022 | Cooley | G06F 16/9024 |
| 2023/0328096 A1* | 10/2023 | Engelberg | H04L 63/1441 726/25 |

FOREIGN PATENT DOCUMENTS

| | | | | |
|---|---|---|---|---|
| CN | 105718624 B | * | 2/2021 | ......... G06F 16/9537 |
| CN | 114780102 A | * | 7/2022 | |
| CN | 115761130 A | * | 3/2023 | |

OTHER PUBLICATIONS

Andersson, et al., "Enabling Successful Collaboration on Digital Platforms in the Manufacturing Industry: A Study of Digital Twins," 2019, Lulea University of Technology, 62 pages.
Extended European Search Report, dated Mar. 13, 2024, regarding EP Application No. 23196804.1, 12 pages.

* cited by examiner

*Primary Examiner* — Dinku W Gebresenbet
(74) *Attorney, Agent, or Firm* — Yee & Associates, P.C.

(57) ABSTRACT

A coupled graph database pair for management of a platform is presented. The coupled graph database pair comprises a model graph database managed in a manufacturer environment, an instance graph database managed in a customer environment, and a plurality of relationships between the nodes of the model graph database and the nodes of the instance graph database. The model graph database comprises nodes of assemblies, sub-assemblies, and parts for a designed configuration of a model of the platform. The instance graph database comprises nodes of assemblies, sub-assemblies, and parts for a real-time configuration of the platform.

27 Claims, 12 Drawing Sheets

INSTANCE GRAPH DATABASE AND MODEL GRAPH DATABASE FOR DATA MANAGEMENT OF A PLATFORM

BACKGROUND INFORMATION

1. Field

The present disclosure relates generally to management of data between different stakeholders for complex platforms.

2. Background

Currently for aircraft and other complex platforms, manufacturer information is delivered in the form of documents. Documents can include owner style manuals with operating instructions, maintenance instructions, and other information related to the platform. Some documents are delivered as paper copies. Some documents are delivered as digital files, such as pdf or XML files.

Over the life of an aircraft, revisions to these documents can occur as a result of service bulletins, airworthiness directives, part upgrades, design changes or specialized instruction changes from operators. These changes cause the documents to become more and more complex. Accordingly, locating desired information for maintenance, engineering, operating conditions, or other types of desired information throughout the life of the platform becomes more time-consuming. Further, locating desired information can become more error prone as it involves manually correlating information from disparate systems.

Therefore, it would be desirable to have a method and apparatus that takes into account at least some of the issues discussed above, as well as other possible issues. For example, it would be desirable to provide information for complex platforms in a format that is at least one of easier to navigate or faster to navigate.

SUMMARY

An embodiment of the present disclosure provides a coupled graph database pair for management of a platform. The coupled graph database pair comprises a model graph database, an instance graph database, and a plurality of relationships between the nodes of the model graph database and the node of the instance graph database. The model graph database is managed in a manufacturer environment. The model graph database comprises nodes of assemblies, sub-assemblies, and parts for a designed configuration of a model of the platform. The instance graph database is managed in a customer environment. The instance graph database comprises nodes of assemblies, sub-assemblies, and parts for a real-time configuration of the platform.

Another embodiment of the present disclosure provides a model graph database managed in a manufacturer environment. The model graph database comprises nodes of assemblies, sub-assemblies, and parts for a designed configuration of a model of a platform, a plurality of model relationships between the nodes; and a plurality of relationships between the nodes and a plurality of nodes of an instance graph database managed in a customer environment, the instance graph database comprising nodes for a real-time configuration of the platform.

Yet another embodiment of the present disclosure provides a method of managing platform data. A model graph database managed is formed in a manufacturer environment, the model graph database comprising nodes of assemblies, sub-assemblies, and parts for a designed configuration of a model of the platform. An instance graph database to be managed in a customer environment is formed, the instance graph database comprising nodes of assemblies, sub-assemblies, and parts for a real-time configuration of the platform. A plurality of relationships is formed between the nodes of the model graph database and the nodes of the instance graph database to form a coupled graph database pair.

A yet further embodiment of the present disclosure provides a method of managing platform data. The method identifies a relationship between a node of a model graph database managed in a manufacturer environment and a node of an instance graph database managed in a customer environment. The model graph database comprising nodes of assemblies, sub-assemblies, and parts for a designed configuration of a model of the aircraft. The instance graph database comprises nodes of assemblies, sub-assemblies, and parts for a real-time configuration of the platform. A relationship is formed for data with the node of the instance graph database wherein the data is associated with the node in the model graph database.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that operational information and data generated through out an aircraft's operational life is fragmented and kept in multiple data stores. The illustrative examples recognize and take into account that information and data can be generated by the organizations that operate the aircraft, by maintenance repair overhaul (MROs) companies that maintain the aircraft and by manufacturers that recommend design changes after the airplane goes into operation.

The illustrative examples recognize and take into account that the impact of these changes is that documents become more and more complex to reflect the effectivity of specific tails and the specific changes required by the operator driven by operational changes that have occurred to the aircraft over time. The illustrative examples recognize and take into account that locating and navigating to the get correct information (e.g., maintenance procedures, SB, AD, engineering work orders, interchangeable parts, allowable damage limits etc.) for a particular tail is time-consuming and error prone as it involves manually correlating information from disparate systems. The illustrative examples also recognize and take into account that loading a manufacturer's updates into the operator's system is a recurring manual task because they are delivered as updates to the previously delivered linear text. The illustrative examples recognize and take into account that data and information come in from different organizations in different forms. The illustrative examples recognize and take into account that there is no easy way to inter-relate the data from the MRO/Operator side of the equation and the OEM side even though it is often desirable to do so.

The illustrative examples provide coupled graph database pairs so that it is easier to search for information, while the information is still delivered in a linear fashion. The illustrative examples provide a framework that allows all stakeholder groups to create link, find and use to get the information that they need. The illustrative examples provide the ability to move from tail related data to model related data and vice versa. The illustrative examples provide a central model of the aircraft that can be used to capture, access, relate and distribute the data in a consistent and integrated manner. The illustrative examples provide a model on the operator or MRO side, to store data regarding part removals, installation and repairs.

Figure 1:
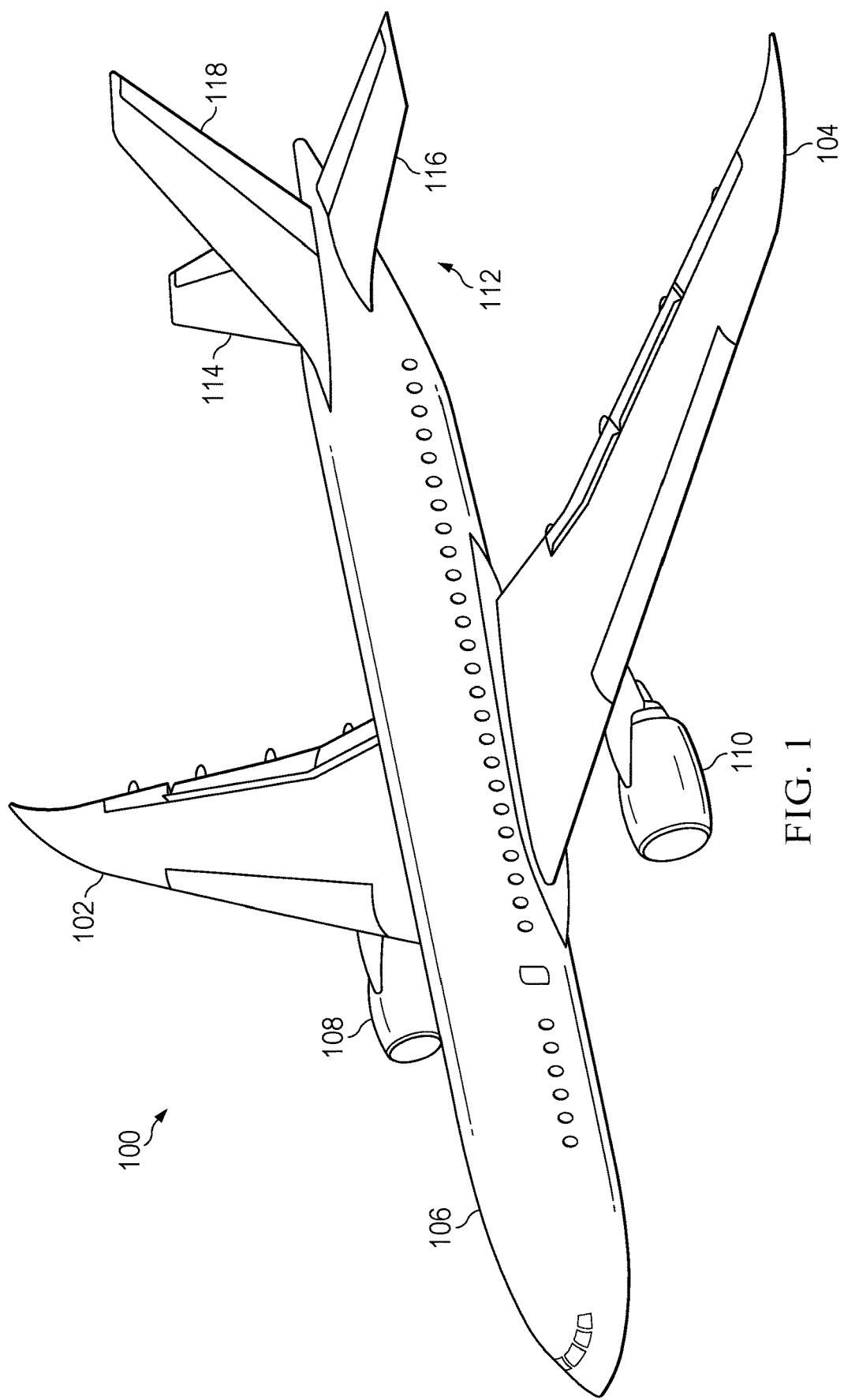
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of a platform that can be managed using the coupled graph database pair of the illustrative examples. For example, portions of body 106, wing 102, or wing 104 can be maintained using information received from a coupled graph database pair of the illustrative examples.

Figure 2:
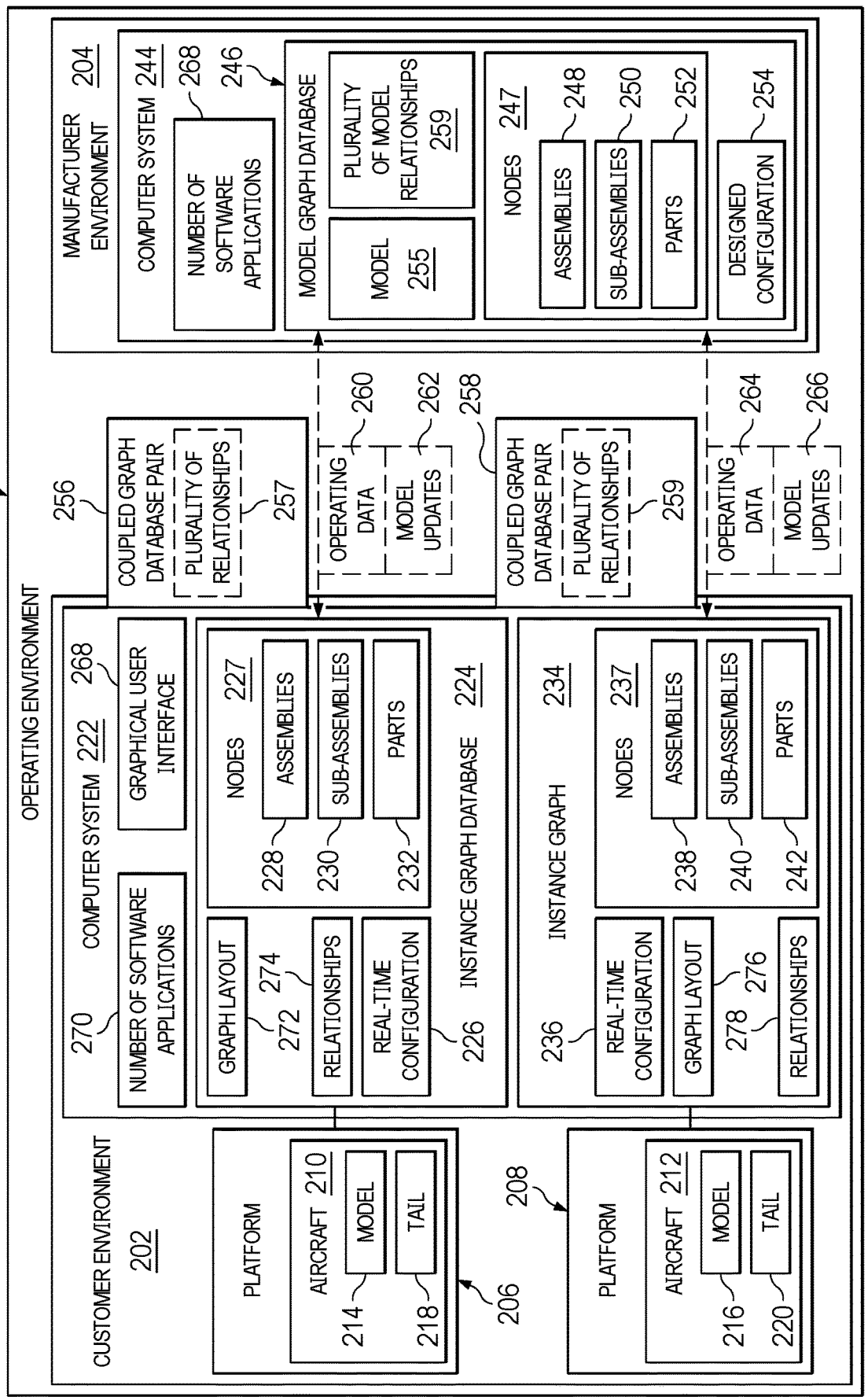
FIG. 2 is an illustration of a block diagram of an operating environment in accordance with an illustrative embodiment.

Turning now to FIG. 2, an illustration of a block diagram of a manufacturing environment is depicted in which an illustrative embodiment may be implemented. Operating environment 200 is an example of an operating environment in which aircraft 100 can operate. Operating environment 200 includes two environments controlled by two different parties. Operating environment 200 includes customer environment 202 and manufacturer environment 204. In some illustrative examples, customer environment 202 can instead be referred to as an "operator environment." Customer environment 202 includes platforms that were manufactured by the manufacturer that controls manufacturer environment 204. As depicted, customer environment 202 includes platform 206 and platform 208. Although customer environment 202 is depicted with two platforms customer environment 202 can include any desirable quantity of platforms.

In this illustrative example, platform 206 takes the form of aircraft 210. In this illustrative example, platform 208 takes the form of aircraft 212. Although the illustrative examples for an illustrative embodiment are described with respect to an aircraft, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

Aircraft 210 is platform 206 of model 214. Aircraft 212 is platform 208 of model 216. A single model can have a number of variations. Aircraft 210 has tail 218. Tail 218 is a unique identifier for aircraft 210. A tail number, such as tail 218 is similar to a vehicle identification number for an automobile. Aircraft 212 has tail 220. Tail 220 is a unique identifier for aircraft 212.

For managing data of aircraft 210, computer system 222 has instance graph database 224. Instance graph database 224 comprises data for real-time configuration 226 of aircraft 210. Instance graph database 224 comprises nodes 227 of assemblies 228, sub-assemblies 230, and parts 232 for real-time configuration 226 of aircraft 210.

For managing data of aircraft 212, computer system 222 has instance graph database 234. Instance graph database 234 comprises data for real-time configuration 236 of aircraft 212. Instance graph database 234 comprises nodes 237 of assemblies 238, sub-assemblies 240, and parts 242 for real-time configuration 236 of aircraft 212.

As depicted, manufacturer environment 204 includes computer system 244 having model graph database 246. Model graph database 246 is modifiable only by manufacturer.

Model graph database 246 is managed in manufacturer environment 204. Model graph database 246 comprises nodes 247 of assemblies 248, sub-assemblies 250, and parts 252 for designed configuration 254 of model 255 of a platform. As depicted, model graph database 246 comprises data for model 255.

Designated configuration 254 comprises an arrangement of elements of model 255 of the platform. In some illustrative examples, model graph database 246 comprises all elements of designated configuration 254 of model 255. In these illustrative examples, nodes 247 of assemblies 248, sub-assemblies 250, and parts 252 for designed configuration 254 include all elements of designed configuration 254.

In some illustrative examples, model graph database 246 comprises a subset of components of model 255. In these illustrative examples, nodes 247 of assemblies 248, sub-assemblies 250, and parts 252 for designed configuration 254 include a subset of elements of designed configuration 254. For instance, in some illustrative examples, model graph database 246 can include only assemblies 248, sub-assemblies 250, or parts 252 that can be repaired or replaced by the customer. As another example, model graph database 246 can include only assemblies 248, sub-assemblies 250, or parts 252 that have regular maintenance. As yet another example, model graph database 246 can include only components of a portion of model 255. The intricacy of model graph database 246 including the quantity of nodes 247 and quality of model relationships in plurality of model relationships 259 can be as complex or as simple as desired.

In this illustrative example, instance graph database 224 forms coupled graph database pair 256 with model graph database 246. In this illustrative example, instance graph database 234 forms coupled graph database pair 258 with model graph database 246. In this illustrative example, model 214 and model 216 are the same as model 255. In other non-depicted illustrative examples, model 214 and model 216 can be different models. In these non-depicted illustrative examples, one of instance graph database 224 or instance graph database 234 would form a coupled graph database pair with a model graph database other than model graph database 246.

Coupled graph database pair 258 includes plurality of relationships 259 between nodes 237 of instance graph database 234 and nodes 247 of model graph database 246. These relationships are modeled as edges in a graph database. Plurality of relationships 259 enable communication of operating data 264 and model updates 266 between customer environment 202 and manufacturer environment 204. In some illustrative examples, operating data 264 is data obtained during operation of aircraft 212. Operating data 264 can include fuel efficiency, frequency of maintenance, or any other desirable data regarding operation and maintenance of aircraft 212.

Although model 216 and model 214 are the same, instance graph database 234 will necessarily have different data than instance graph database 224. For example, instance graph database 224 contains serial numbers for parts 232 present in aircraft 210. Instance graph database 234 contains serial numbers for parts 242 of aircraft 212. Additionally, aircraft 210 can have different options than aircraft 212. For example, seating layout, decor, or other sub-assemblies within aircraft 212 can be different from aircraft 210 while still having the same model.

In some illustrative examples, instance graph database 224 and instance graph database 234 have similar hierarchical layouts. In some illustrative examples, relationships between nodes 227 are laid out similarly to relationships between nodes 237.

Coupled graph database pair 256 includes plurality of relationships 257 between nodes 227 of instance graph database 224 and nodes 247 of model graph database 246. These relationships are modeled as edges in a graph databases. Plurality of relationships 257 enable communication of operating data 260 and model updates 262 between customer environment 202 and manufacturer environment 204. In some illustrative examples, operating data 260 is data obtained during operation of aircraft 210. Operating data 260 can include fuel efficiency, frequency of maintenance, or any other desirable data regarding operation and maintenance of aircraft 210.

In some illustrative examples, parts 232 nodes 227 include nodes with specific serial numbers of installed parts. In some illustrative examples, instance graph database 224 comprises a serial number of an installed part. In some illustrative examples, plurality of relationships 257 comprises a relationship between the serial number of the installed part and specifications of a part for the model of the platform. In some illustrative examples, model graph database 246 further comprises replacement part model numbers with relationships to the part, wherein the replacement part model numbers are alternative parts identified as acceptable replacements for the part. In some of these illustrative examples, the replacement part model numbers will be part of parts 252 of model graph database 246.

As depicted, in instance graph database 224, relationships 274 between nodes 227 forms graph layout 272. Plurality of relationships 257 between nodes 227 of instance graph database 224 and nodes 247 of model graph database 246 as well as relationships 274 between nodes 227 of instance graph database 224 allow for linking of disparate information. Navigating plurality of relationships 257 and relationships 274 allow for faster data identification than in typical linear databases. Navigating the links between nodes 227 and nodes 247 allows for finding the disparate information. Traversing the data is faster using plurality of relationships 257 and relationships 274.

In instance graph database 234, relationships 278 between nodes 237 form graph layout 276 of instance graph database 234. Plurality of relationships 259 between nodes 237 of instance graph database 234 and nodes 247 of model graph database 246 as well as relationships 278 between nodes 237 of instance graph database 234 allow for linking of disparate information. Navigating plurality of relationships 259 and relationships 278 allow for faster data identification than in typical linear databases. Navigating the links between nodes 237 and nodes 247 allows for finding the disparate information. Traversing the data is faster using plurality of relationships 259 and relationships 278.

In some illustrative examples, model graph database 246 further comprises a plurality of model relationships 259 between nodes 247 of model graph database 246.

In some illustrative examples, instance graph database 224 comprises a plurality of instance relationships, relationships 274, between nodes 227 the instance graph database 224, and plurality of model relationships 259 and relationships 274 are the same. In these illustrative examples, graph layout 272 is substantially similar to a graph layout for model graph database 246.

In other illustrative examples, relationships 274 are different from plurality of model relationships 259. In some illustrative examples, relationships 274 are more simplistic than plurality of model relationships 259. In some illustrative examples, instance graph database 224 is a more simplistic hierarchy than model graph database 246.

Model graph database 246 is managed in manufacturer environment 204. Model graph database 246 comprises nodes 247 of assemblies 248, sub-assemblies 250, and parts 252 for designed configuration 254 of model 255 of platform 206; plurality of model relationships 257259 between nodes 247; and plurality of relationships 257 between nodes 247 and a plurality of nodes 227 of instance graph database 224 managed in customer environment 202. Instance graph database 224 comprises nodes 227 for real-time configuration 226 of platform 206.

By using graph databases such as instance graph database 224 and model graph database 246, new types of relationships and information can be added without recompiling software or rebuilding the system. By using graph databases such as instance graph database 224 and model graph database 246, label and property types (data schema) can be added and deleted at run-time for both nodes and edges. By using graph databases such as instance graph database 224 and model graph database 246, indirect relationships between nodes can be identified by traversing their relationships with other nodes. Traversing relationships 274, plurality of relationships 257, and plurality of model relationships 259 between nodes 227 and nodes 247 obtains data in a faster and more efficient way than utilizing linear documents. Traversing relationships 278, plurality of relationships 259, and plurality of model relationships 259 between nodes 237 and nodes 247 obtains data in a faster and more efficient way than utilizing linear documents.

In some illustrative examples, number of software applications 270 can be used to perform operations in instance graph database 224 or instance graph database 234. In some illustrative examples, number of software applications 270 can explore instance graph database 224 or instance graph database 234 and model graph database 246 to follow links and execute queries to answer questions. Software applications 270 can be tailored to efficiently answer a specific question, without needing to flip between sections of manuals or different manuals. Number of software applications 270 can be configured to answer repair questions, replacement questions, operation questions, maintenance questions, or any other type of question the operator may have. For example, number of software applications 270 can be configured to traverse graph database 224 and model graph database 246 to determine a part model that can replace a part of parts 232. As another example, number of software applications 270 can be configured to traverse graph database 224 and model graph database 246 to determine a repair method for a structural inconsistency. In some illustrative examples, number of software applications 270 store data within at least one of instance graph database 224 or instance graph database 234.

In some illustrative examples, graphical user interface 268 allows an operator to interact with instance graph database 224 or instance graph database 234. In some illustrative examples, graphical user interface 268 allows an operator to perform an inquiry. In some illustrative examples, graphical user interface 268 allows an operator to begin a query using number of software applications 270. In some illustrative examples, graphical user interface 268 allows an operator to enter data into instance graph database 224 or instance graph database 234.

Coupled graph database pair 256 and coupled graph database pair 258 do not require a fixed table structure. Coupled graph database pair 256 and coupled graph database pair 258 can be scaled to be very large.

The illustrative examples provide model Graph updates that can occur as changes occur (in near real time). The manufacturer can provide a connector application that will automatically update the instance graph database as changes occur (in real-time or near real-time).

The illustration of operating environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, greater than or less than two platforms can be present in customer environment 202. As another example, platform 206 and platform 208 can have different models. In this example, an additional model graph database would be present in computer system 244 and platform 206 and platform 208 would form coupled graph database pairs with different model graph databases. As another example, instance graph database 224 and model graph database 246 need not be stored on different computer systems. In some illustrative examples, instance graph database 224 and model graph database 246 can be stored in the same computer system. Instance graph database 224 need not be stored in a location physically controlled by a customer. In some illustrative examples, instance graph database 224 and model graph database 246 can be stored in the cloud.

Although not depicted in FIG. 2, model graph database 246 can store a variety of different types of data. In some illustrative examples, model graph database 246 further comprises a number of repair tasks relationally associated with a number of nodes of nodes 247 of assemblies 248, sub-assemblies 250, and parts 252. As used herein, "a number of," when used with reference to items means one or more items. For example, a number of repair tasks is one or more repair tasks.

In some illustrative examples, model graph database 246 further comprises a number of service bulletins relationally associated with a number of nodes of nodes 247 of assemblies 248, sub-assemblies 250, and parts 252. In some illustrative examples, model graph database 246 further comprises operational data from an instance of the platform, the operational data relationally associated with a number of nodes of nodes 247 of assemblies 248, sub-assemblies 250, and parts 252. In some illustrative examples, model graph database 246 further comprises replacement part model numbers with relationships to the part, wherein the replacement part model numbers are alternative parts identified as acceptable replacements for the part.

Instance graph database 224 is maintained by the operator (customer) and represents the as-operating summary of platform 206, including the parts and repairs and maintenance that have been performed. In some illustrative examples, platform 206 is aircraft 210, and the instance graph databases each represent the as-flying picture of every tail including parts installed and structural repairs performed over time.

Links are established between model graph database 246 and the instance graph databases, such as instance graph database 224 and instance graph database 234, to reflect various relationships. For example, the relationships established between nodes 247 of model graph database 246 and instance graph database 224 demonstrate at least one of a specific serialized part has been installed to replace the original OEM part, a service bulletin was implemented on a serialized part or assembly, a serialized part is an instance of a part model, or a tail is an instance of an aircraft model. These relationships are modeled as Edges in a graph databases.

The illustrative examples create two graphs, model graph database 246 and instance graph database 224 to represent the digital twin of a platform, such as an aircraft. The digital twin allows both the designed and as-flying configuration of the aircraft to be modeled. It also provides the framework on which many other pieces of data can be attached over time. For example, a repair description can be linked to the specific part (node) of the aircraft. As another example, data associated with a flight can be linked to the aircraft (node). Data associated with a design change can be linked to a particular part number. Operator (nodes) can be linked to an aircraft as it changes ownership.

Figure 3:
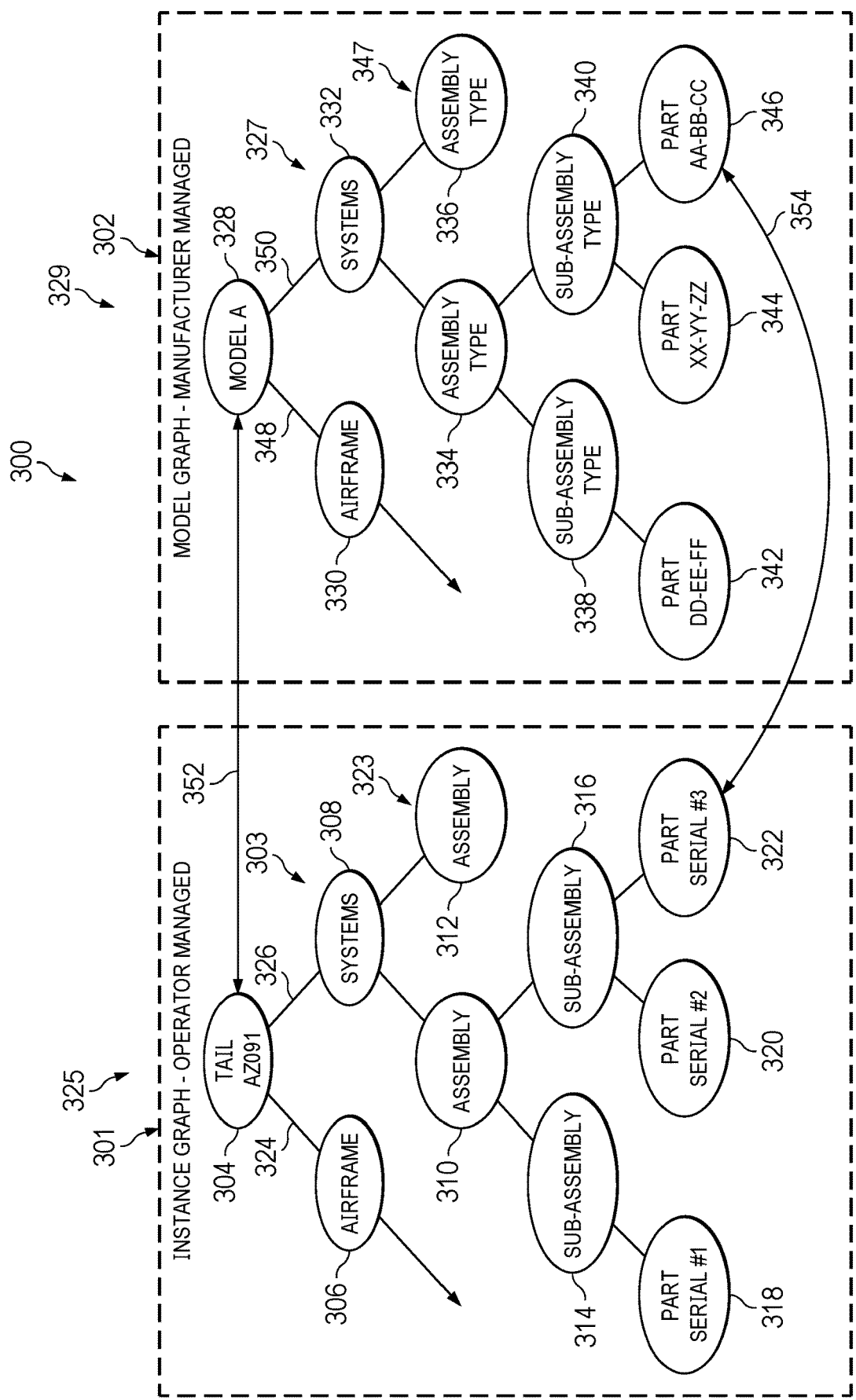
FIG. 3 is an illustration of a graphical representation of a coupled graph database pair in accordance with an illustrative embodiment.

Turning now to FIG. 3 is an illustration of a graphical representation of a coupled graph database pair is depicted in accordance with an illustrative embodiment. Coupled graph database pair 300 is an implementation of coupled graph database pair 256 or coupled graph database pair 258 of FIG. 2. Coupled graph database pair 258 can be used to manage data for aircraft 100 of FIG. 1.

Coupled graph database pair 300 comprises instance graph database 301 managed in a customer environment and model graph database 302 managed in a manufacturer environment. Instance graph database 301 comprises nodes 303 of assemblies, sub-assemblies, and parts for a real-time configuration of a platform. In some illustrative examples, the platform takes the form of an aircraft.

Instance graph database 301 includes tail number 304 that is a unique identifier for the platform. In this illustrative example, tail number 304 for the platform is AZ091. Nodes 303 comprise systems including airframe 306 and systems 308. Nodes 303 further comprise assemblies: assembly 310 and assembly 312, and subassemblies: subassembly 314 and subassembly 316. Part serial #1 318 is a part serial number for a part that is a component of sub-assembly 314. Part serial #2 320 and part serial #3 322 are serial numbers for parts that are components of sub-assembly 316.

As depicted, instance graph database 301 is organized as a design of an aircraft is organized. In other words, instance graph database 301 models the hierarchy of the platform. Instance graph database 301 is updated as the real-world platform is modified. For example, part serial #3 322 can be replaced in instance graph database 301 when the part is replaced within the physical platform. In some illustrative examples, instance graph database 301 is designed based on an illustrated parts catalog (IPC). In some illustrative examples, instance graph database 301 is a decomposition of the platform. In some illustrative examples, instance graph database 301 is created based on the IPC.

Model graph database 302 includes model A 328 that is a model number for at least one platform. In some illustrative examples, model A 328 is a model number for multiple platforms. In this illustrative example, tail number 304 for the platform is AZ091. Nodes 303 comprise systems including airframe 306 and systems 308. Nodes 303 further comprise assemblies: assembly 310 and assembly 312, and subassemblies: subassembly 314 and subassembly 316. Part serial #1 318 is a part serial number for a part that is a component of sub-assembly 314. Part serial #2 320 and part serial #3 322 are serial numbers for parts that are components of sub-assembly 316.

Instance graph database comprises relationships 323 between nodes 303. In some illustrative examples, the relationships 323 are referred to as edges. For example, airframe 306 is connected to tail AZ091 by relationship 324. Similarly, systems 308 is connected to tail AZ091 by relationship 326.

Nodes 303 and relationships 323 create graph layout 325. As depicted, graph layout 325 is similar to graph layout 329 of model graph database 302. However, graph layout 325 need not be the same as graph layout 329.

Model graph database 302 comprises nodes 327 of assemblies, sub-assemblies, and parts for a designed configuration of a model of the platform, model A 328. For model A 328, nodes 327 include airframe 330 and systems 332. Although not depicted here for clarity and readability, relationships can exist between airframe 306 and airframe 330.

Model graph database 302 further comprises assemblies of systems 332, assembly type 334 and assembly type 336. Assembly type 334 has sub-assembly type 338 and sub-assembly type 340. Model graph database 302 further comprises Part DD-EE-FF 342, part XX-YY-ZZ 344, and Part AA-BB-CC 346. In this illustrative example, alphanumeric characters are used to denote a specific part model.

Relationships 347 connect nodes 327. Relationships 347 include relationship 348 between airframe 330 and model A 328 as well as relationship 350 between systems 332 and model A 328. There are several other relationships depicted in FIG. 3, but for brevity each relationship is not numbered. Further, there can be additional relationships not depicted in FIG. 3. FIG. 3 is provided for ease of example and discussion and is not limiting.

In this illustrative example, graph layout 325 and graph layout 329 are similar. For example, relationship 324 of instance graph database and relationship 348 of model graph database can be the same. Additionally, relationship 326 of instance graph database and relationship 350 of model graph database can be the same.

Nodes 327 and relationships 347 create graph layout 329. In this illustrative example, graph layout 329 has a hierarchy of the design of the platform. For example, if the platform is an aircraft, graph layout 329 can be the hierarchy of the aircraft. In some illustrative examples, nodes 327 of model graph database 302 are formed based on an illustrated parts catalog for the platform. In this illustrative example, assemblies such as assembly type 334 and assembly type 336 are connected directly to system 332 and indirectly to model A 328. In this illustrative example, sub-assemblies, such as sub-assembly type 338 and sub-assembly type 340, are directly connected to the respective assembly, assembly type 334. In this illustrative example, sub-assemblies, such as sub-assembly type 338 and sub-assembly type 340, are indirectly connected to systems 332 and model A 328.

In this illustrative example, graph layout 325 also has a hierarchy of the design of the platform. In graph layout 325, nodes 303 of instance graph database 301 are formed and connected in relationships 323 based on a design of the platform.

Plurality of relationships between the nodes 327 of model graph database 302 and nodes 303 of instance graph database 301 form coupled graph database pair 300. For example, relationship 352 connects Tail AZ091 304 to model A 328. Further, relationship 354 connects part AA-BB-CC 346 to part serial #3 322. Part serial #3 322 is a specific instance of part AA-BB-CC within the platform.

During design, a model graph database managed in a manufacturer environment, such as model graph database 302, is formed. During manufacture of the platform, an instance graph database to be managed in a customer environment, instance graph database 301, is formed. A plurality of relationships is formed between the nodes 327 of model graph database 302 and nodes 303 of instance graph database 301 to form coupled graph database pair 300. Upon delivery of the platform, instance graph database 301 is provided to the customer. The customer then maintains up-to-date information for the platform within instance graph database 301.

Figure 4:
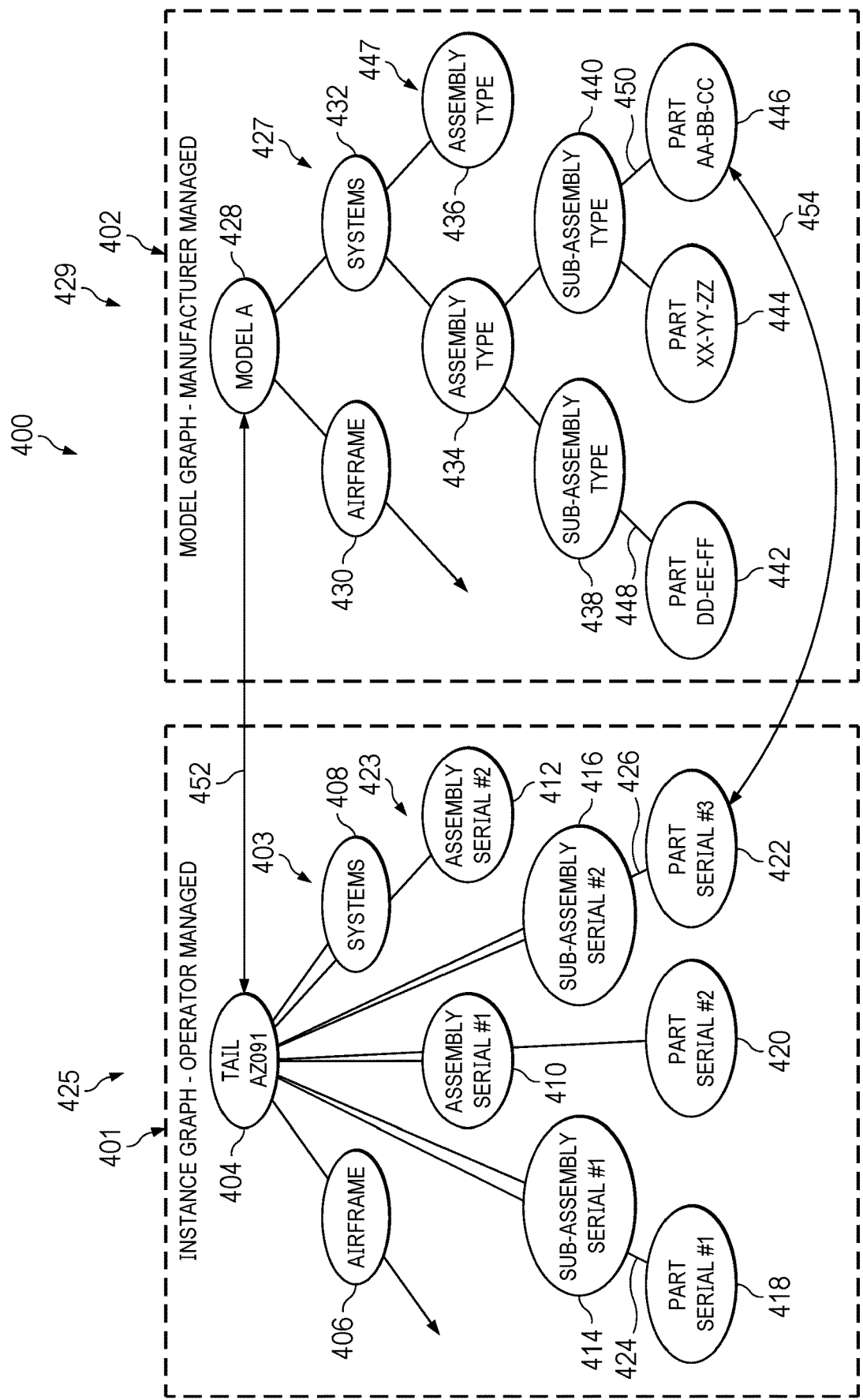
FIG. 4 is an illustration of a graphical representation of a coupled graph database pair in accordance with an illustrative embodiment.

Turning now to FIG. 4, an illustration of a graphical representation of a coupled graph database pair is depicted in accordance with an illustrative embodiment. Coupled graph database pair 300 is an implementation of coupled graph database pair 256 or coupled graph database pair 258 of FIG. 2. Coupled graph database pair 258 can be used to manage data for aircraft 100 of FIG. 1.

Coupled graph database pair 400 comprises instance graph database 401 managed in a customer environment and model graph database 402 managed in a manufacturer environment. Instance graph database 401 comprises nodes 403 of assemblies, sub-assemblies, and parts for a real-time configuration of a platform. In some illustrative examples, the platform takes the form of an aircraft.

Instance graph database 401 includes tail number 404 that is a unique identifier for the platform. In this illustrative example, tail number 404 for the platform is AZ091. Nodes 403 comprise systems including airframe 406 and systems 408. Nodes 403 further comprise assemblies: assembly 410 and assembly 412, and subassemblies: subassembly 414 and subassembly 416. Part serial #1 418 is a part serial number for a part that is a component of sub-assembly 414. Part serial #2 420 and part serial #3 422 are serial numbers for parts that are components of sub-assembly 416.

As depicted, model graph database 402 is organized as a design of an aircraft is organized. In other words, model graph database 402 models the hierarchy of the platform. In this illustrative example, instance graph database 401 is not organized as a design of an aircraft is organized. In this illustrative example, instance graph database 401 does not model the hierarchy of the platform.

Instance graph database 401 is updated as the real-world platform is modified. For example, part serial #3 422 can be replaced in instance graph database 401 when the part is replaced within the physical platform. In some illustrative examples, instance graph database 401 is designed based on an illustrated parts catalog. In some illustrative examples, nodes 403 of instance graph database 401 are created based on the IPC but relationships 423 are not based on the IPC.

Model graph database 402 includes model A 428 that is a model number for at least one platform. In some illustrative examples, model A 428 is a model number for multiple platforms. In this illustrative example, tail number 404 for the platform is AZ091. Nodes 403 comprise systems including airframe 406 and systems 408. Nodes 403 further comprise assemblies: assembly 410 and assembly 412, and subassemblies: subassembly 414 and subassembly 416. Part serial #1 418 is a part serial number for a part that is a component of sub-assembly 414. Part serial #2 420 and part serial #3 422 are serial numbers for parts that are components of sub-assembly 416.

Instance graph database comprises relationships 423 between nodes 403. In some illustrative examples, the relationships 423 are referred to as edges. For example, airframe 406 is connected to tail AZ091 by relationship 424. Similarly, systems 408 is connected to Tail AZ091 by relationship 426.

Nodes 403 and relationships 423 create graph layout 425. As depicted, graph layout 425 is different from graph layout 429 of model graph database 402. Although nodes 403 and nodes 427 are similar, relationships 423 and relationships 447 are different. For example, relationship 424 between part serial #1 418 and tail AZ091 404 is direct while relationship 448 between part DD-EE-FF 442 and sub-assembly type 438 creates an indirect connection to model A 428. As another example, relationship 426 between part serial #3 422 and tail AZ091 404 is direct while relationship 450 between part AA-BB-CC 446 and sub-assembly type 440 creates an indirect connection to model A 428.

Model graph database 402 comprises nodes 427 of assemblies, sub-assemblies, and parts for a designed configuration of a model of the platform, model A 428. For model A 428, nodes 427 include airframe 430 and systems 432. Although not depicted here for clarity and readability, relationships can exist between airframe 406 and airframe 430.

Model graph database 402 further comprises assemblies of systems 432, assembly type 434 and assembly type 436. Assembly type 434 has sub-assembly type 438 and sub-assembly type 440. Model graph database 402 further comprises Part DD-EE-FF 442, part XX-YY-ZZ 444, and Part AA-BB-CC 446. In this illustrative example, alphanumeric characters are used to denote a specific part model.

Relationships 447 connect nodes 427. Relationships 447 include relationship 448 between airframe 430 and model A 428 as well as relationship 450 between systems 432 and model A 428. There are several other relationships depicted in FIG. 4, but for brevity each relationship is not numbered. Further, there can be additional relationships not depicted in FIG. 4. FIG. 4 is provided for ease of example and discussion and is not limiting.

In this illustrative example, graph layout 425 and graph layout 429 have corresponding nodes. In this illustrative example, graph layout 425 and graph layout 429 have different relationships between the nodes in the graphs.

In this illustrative example, nodes 403 of instance graph database 401 are each directly connected to tail AZ091. In this illustrative example, graph layout 425 of instance graph database 401 is not representative of a hierarchy of a platform.

In this illustrative example, graph layout 425 is more simplistic than graph layout 429. In some illustrative examples, by having a more simplistic graph layout, a graph database can be smaller and take less storage than a graph layout with a hierarchical model of the platform. For example, instance graph database 401 can be smaller and use less storage than model graph database 402. By being connected to model graph database 402 by a plurality of relationships, the model graph database 402 can provide the hierarchy to be utilized in traversing coupled graph database pair 400.

Plurality of relationships between the nodes of the model graph database and the nodes of the instance graph database form coupled graph database pair 400. For example, relationship 452 connects Tail AZ091 404 to model A 428. Further, relationship 454 connects part AA-BB-CC 446 to part serial #3 422. Part serial #3 422 is a specific instance of part AA-BB-CC within the platform. As depicted, the plurality of relationships comprises relationship 454 between the serial number of the installed part and specifications of a part for the model of the platform.

During design, a model graph database managed in a manufacturer environment, such as model graph database 402, is formed. During manufacture of the platform, an instance graph database to be managed in a customer environment, instance graph database 401, is formed. A plurality of relationships is formed between the nodes 427 of model graph database 402 and nodes 403 of instance graph database 401 to form coupled graph database pair 400. Upon delivery of the platform, instance graph database 401 is provided to the customer. The customer then maintains up-to-date information for the platform within instance graph database 401.

Figure 5:
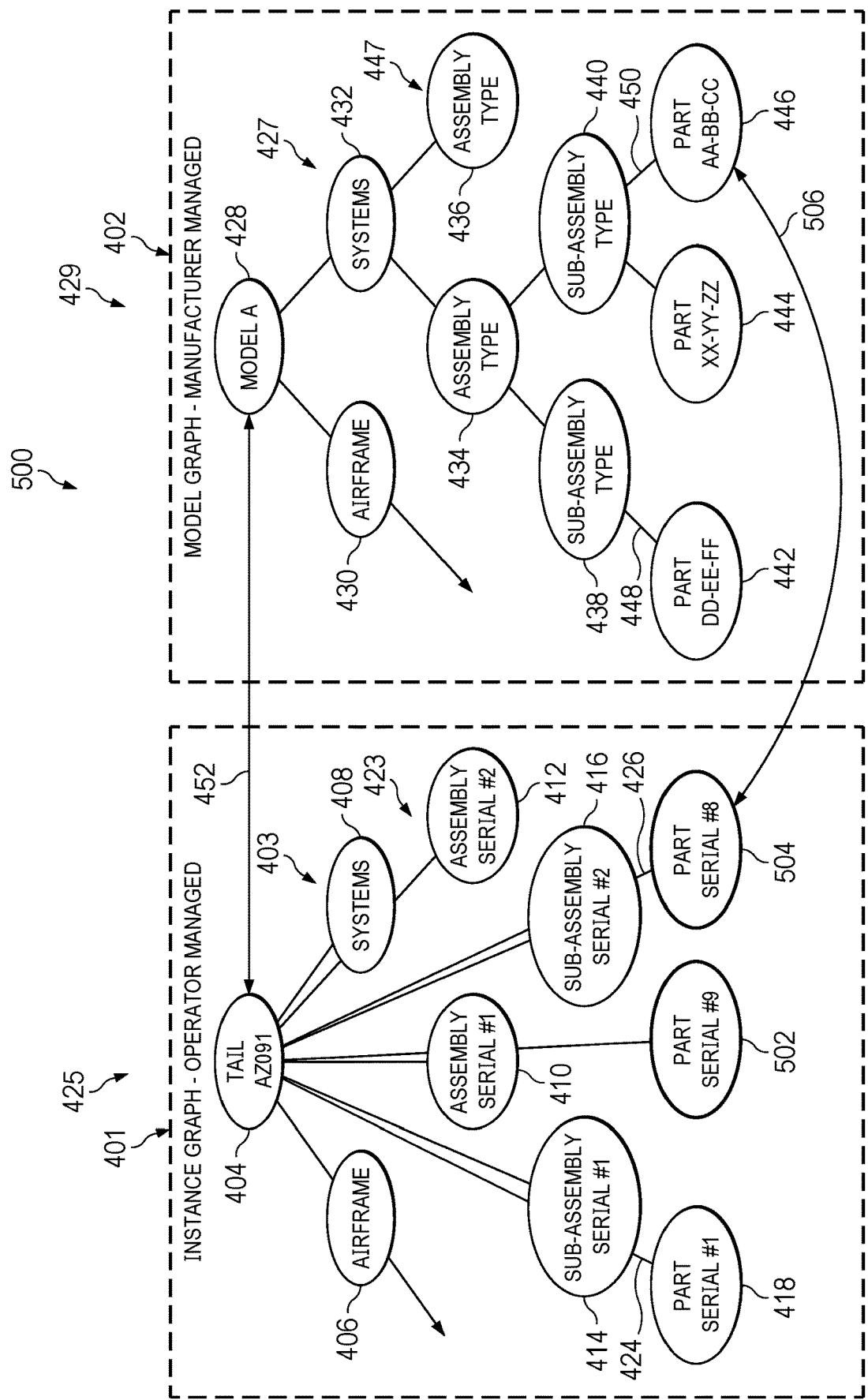
FIG. 5 is an illustration of a graphical representation of a coupled graph database pair in accordance with an illustrative embodiment.

Turning now to FIG. 5, an illustration of a graphical representation of a coupled graph database pair is depicted in accordance with an illustrative embodiment. View 500 is a view of coupled graph database pair 400 after the platform has been placed into operation. In view 500, part serial #2 and part serial #3 are not present. In view 500, part serial #9 502 has replaced part serial #2 of FIG. 4. In some illustrative examples, serial #9 502 is installed in the platform during maintenance to replace part serial #2. In view 500, part serial #8 504 has replace part serial #3 of FIG. 4.

By having relationship 452, model graph database 402 receives notice of a part serial number, part serial #8 504 from instance graph database 401. Relationship 506 is formed between the part serial number, part serial #8 504 and a part node, part AA-BB-CC 446, in model graph database 402.

Figure 6:
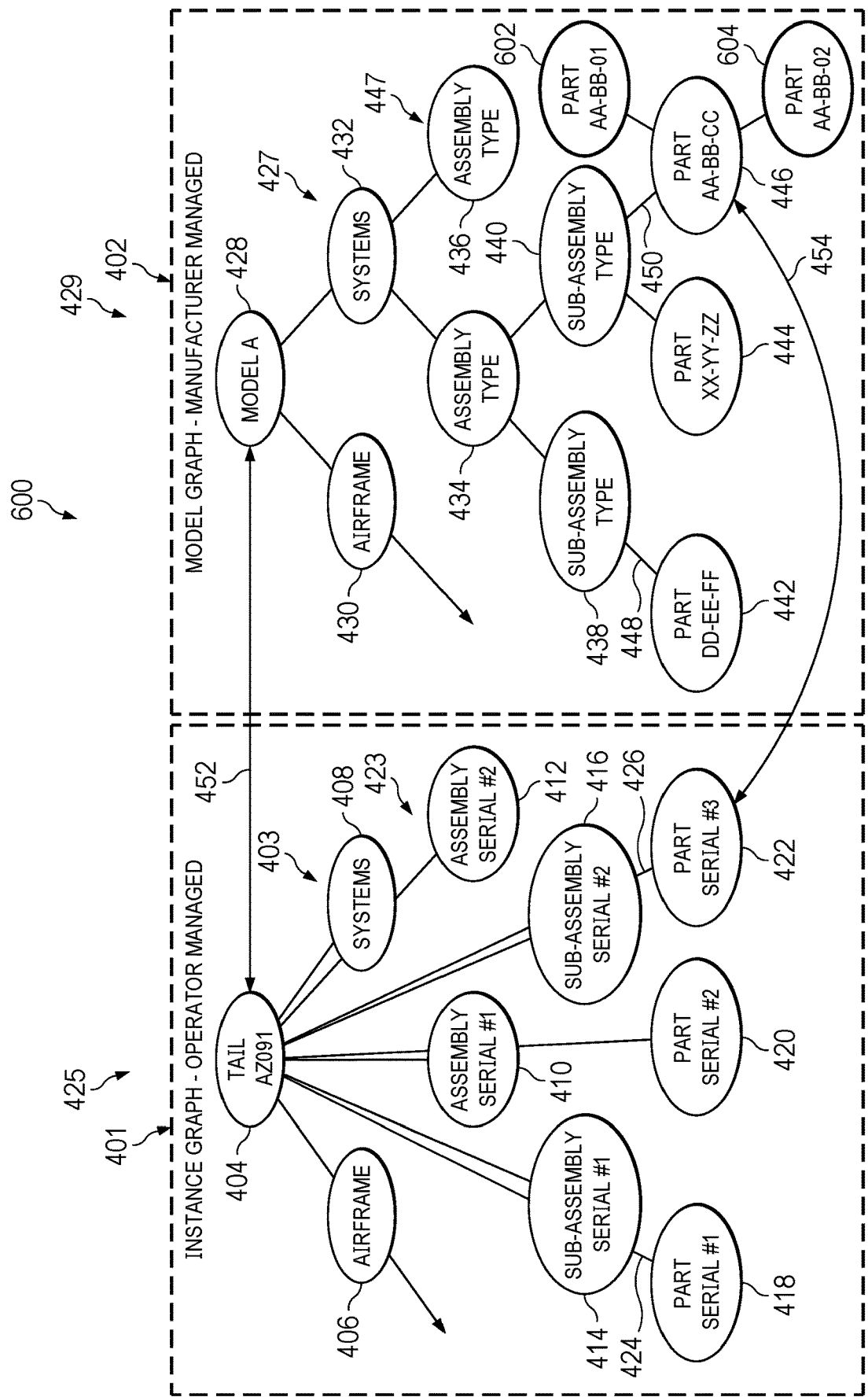
FIG. 6 is an illustration of a graphical representation of a coupled graph database pair in accordance with an illustrative embodiment.

Turning now to FIG. 6, an illustration of a graphical representation of a coupled graph database pair is depicted in accordance with an illustrative embodiment. View 600 is a view of coupled graph database pair 400 after instance graph database 401 has been provided to the customer. View 600 is a view of coupled graph database pair 400 after alternative part models have been identified that can be used to replace a different part model. For example, part AA-BB-01 602 has been identified as a potential alternative to part AA-BB-CC 446. As another example, part AA-BB-02 604 has been identified as a potential alternative to part AA-BB-CC 446. In view 600, relationships have been generated between replacement part model numbers and a part in model graph database 402. For example, both part AA-BB-01 602 and part AA-BB-02 604 are replacement part model numbers and are connected via relationships to part AA-BB-CC 446. In this illustrative example, the replacement part model numbers are alternative parts identified as acceptable replacements for the part.

Figure 7:
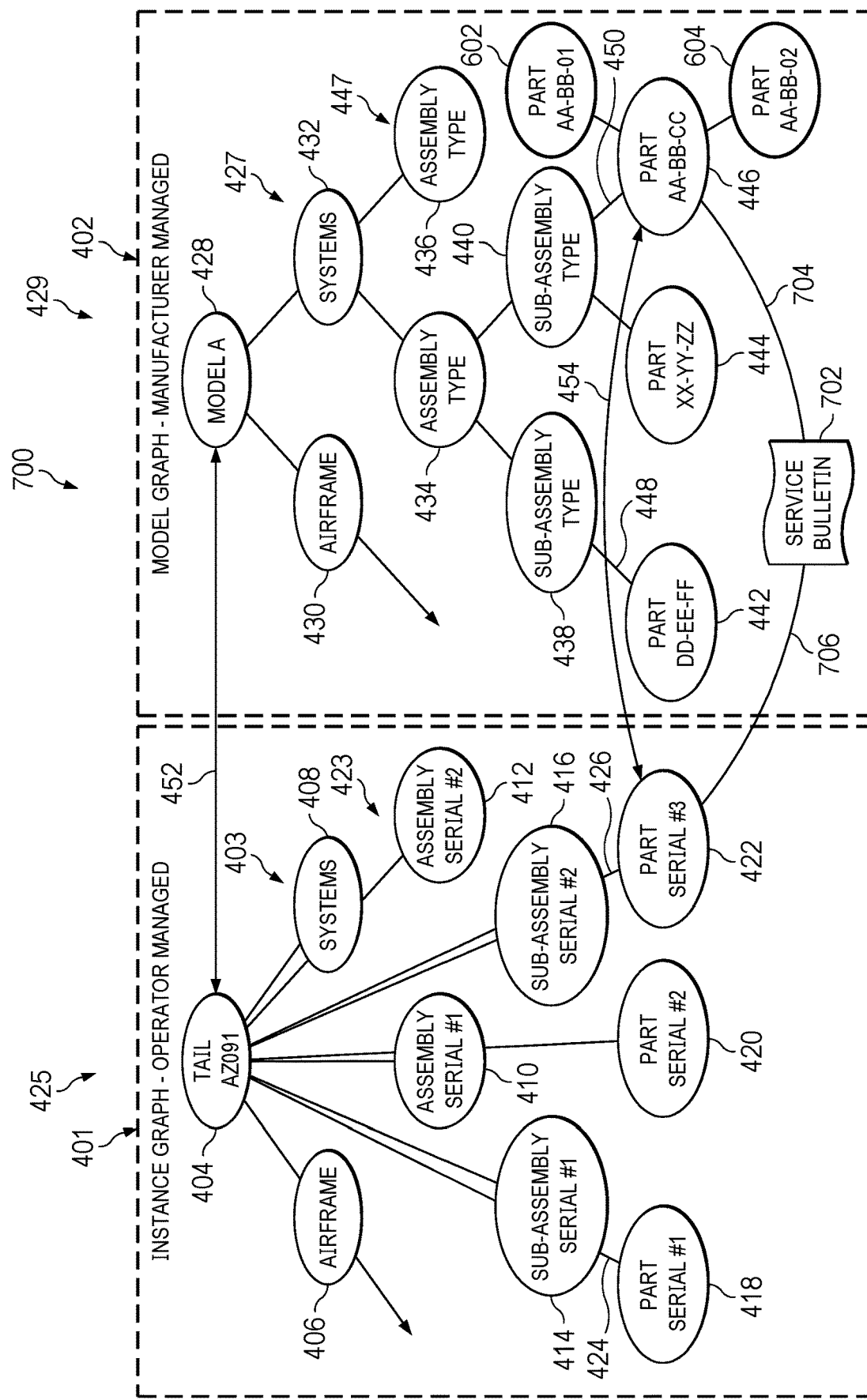
FIG. 7 is an illustration of a graphical representation of a coupled graph database pair in accordance with an illustrative embodiment.

Turning now to FIG. 7, an illustration of a graphical representation of a coupled graph database pair is depicted in accordance with an illustrative embodiment. View 600 is a view of coupled graph database pair 400 after instance graph database 401 has been provided to the customer. View 600 is a view of coupled graph database pair 400 after replacement part model numbers were provided in FIG. 5. In view 600, a service bulletin, service bulletin 702 is identified for part AA-BB-CC 446.

In view 600, a number of service bulletins relationally associated with at least one of nodes 427 of model graph database 402 has been identified. In view 700, relationship 704 connects Part AA-BB-CC 446 and service bulletin 702. Additionally, due to relationship 454, service bulletin 702 is connected to part serial #3 422 in relationship 706. In some illustrative examples, the manufacturer computer system displays the service bulletin to an operator/customer. In some illustrative examples, service bulletin 702 is sent to instance graph database 401. In some illustrative examples, service bulletin 702 is stored in instance graph database 401 and an operator/customer can open and view service bulletin 702 at the operator environment.

In some illustrative examples, at least one of the nodes of the instance graph database relationally connected to the at least one of the nodes of the model graph database is identified. In this illustrative example, part serial #3 connected to part AA-BB-CC 446 is identified. 401 In this illustrative example, service bulletin 702 is associated with part serial #3 422.

Figure 8:
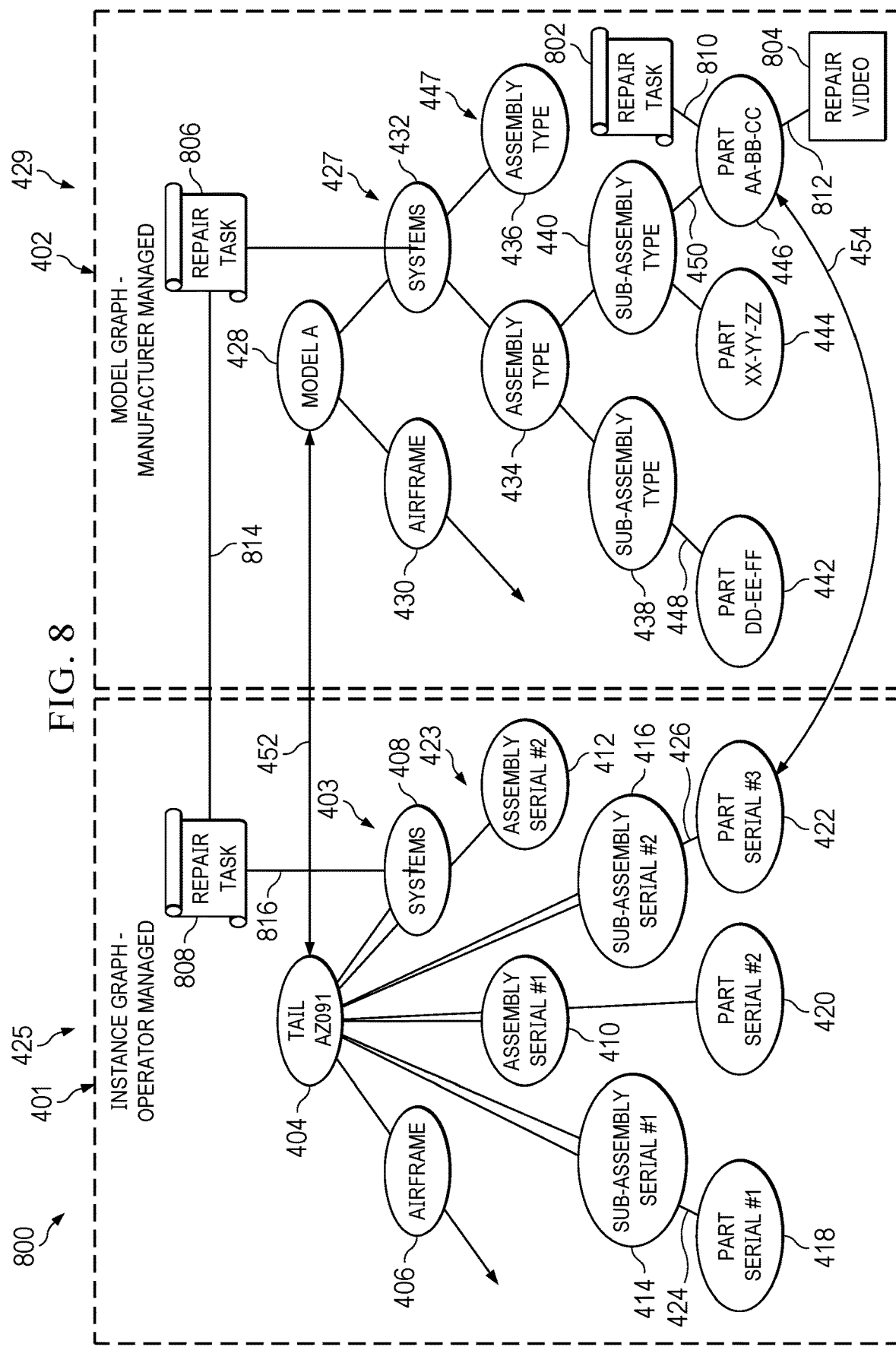
FIG. 8 is an illustration of a graphical representation of a coupled graph database pair in accordance with an illustrative embodiment.

Turning now to FIG. 8, an illustration of a graphical representation of a coupled graph database pair is depicted in accordance with an illustrative embodiment. In view 800, multiple repair task documents are available in coupled graph database pair 400. In view 800, repair task instructions 802 and repair video 804 are connected to part AA-BB-CC 446 by relationship 810 and relationship 812 respectively. Due to relationship 454, repair task 802 and repair video 804 can be easily and quickly accessed and reviewed for repair of part serial #3 422.

As another example, repair task data 806 is associated with systems 432. Repair task data 808 specific to repair of systems 408 of the platform are present in instance graph database 401. Repair task data 808 is connected to repair task data 806 by relationship 814.

In some illustrative examples, model graph database 402 receives notice of a repair task data, such as repair task data 808, from instance graph database 401. In some illustrative examples, a relationship, such as relationship 814, is formed between repair task data 808 and a part node in model graph database 402. In this illustrative example, relationship 814 is formed between repair task data 808 and repair task data 806. In some illustrative examples, the relationship is formed between a node of a system or a subsystem of model graph database 402. In some illustrative examples, the repair task data, such as repair task data 808, is copied to model graph database 402.

Although not depicted in FIG. 8, in some illustrative examples, notice of operational data is received at model graph database 402 from instance graph database 401. In some illustrative examples, a relationship is formed between the operational data and a node in model graph database 402. In some illustrative examples, the operational data is copied to model graph database 402.

In some illustrative examples, providing the manufacturer access to operational data allows for improvements to the design of model A 428. In some illustrative examples, providing the manufacturer access to operational data allows for improvements to the design of future platforms from the manufacturer. For example, providing access to operational data can provide information regarding fuel efficiency, operating times, length of maintenance, scheduling of maintenance, frequency of maintenance, and other aspects of operation of the platform that could be improved.

Figure 9A:
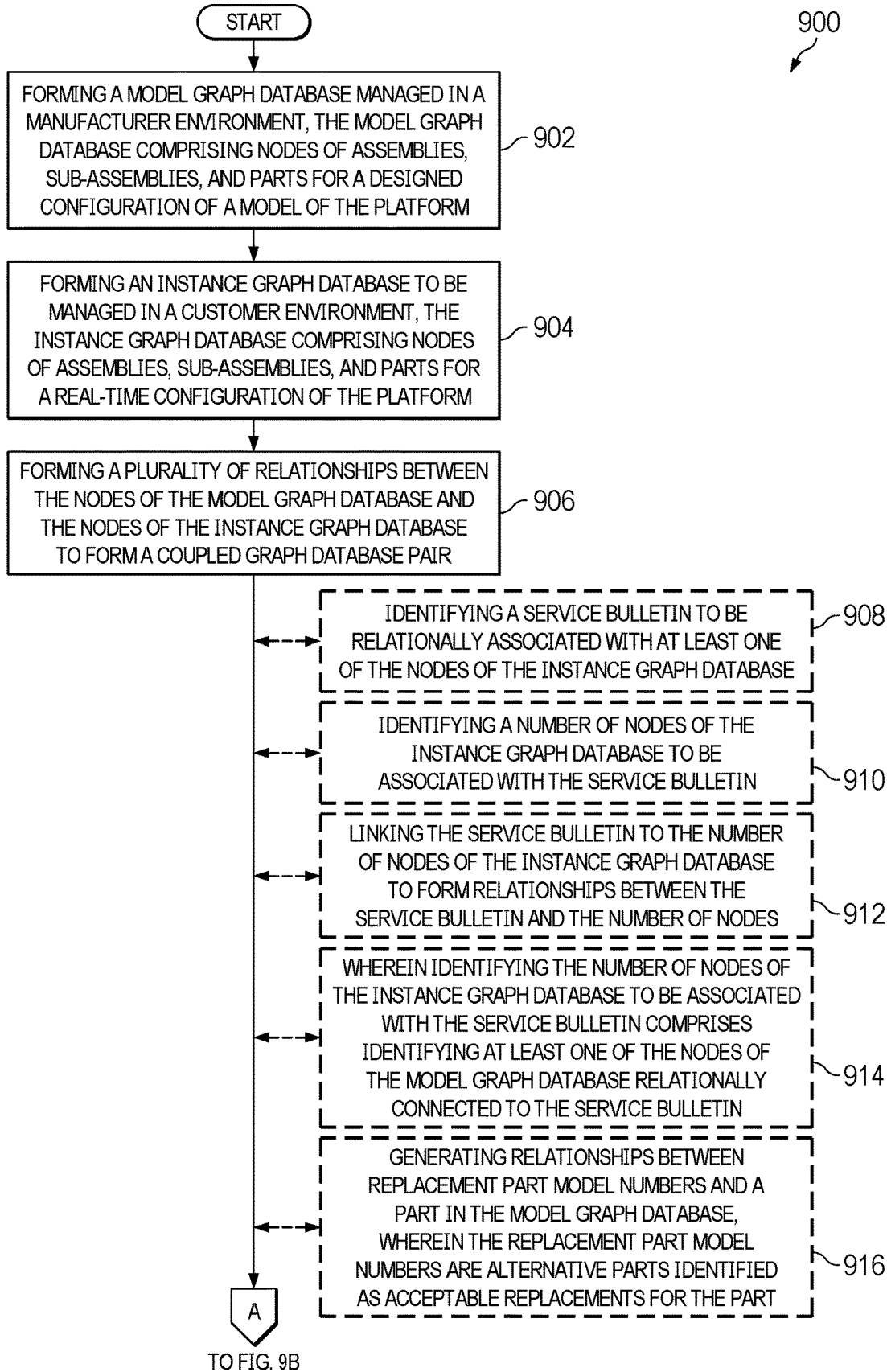
FIGS. 9A and 9B are a flowchart of a method of managing platform data in accordance with an illustrative embodiment.
Figure 9B:
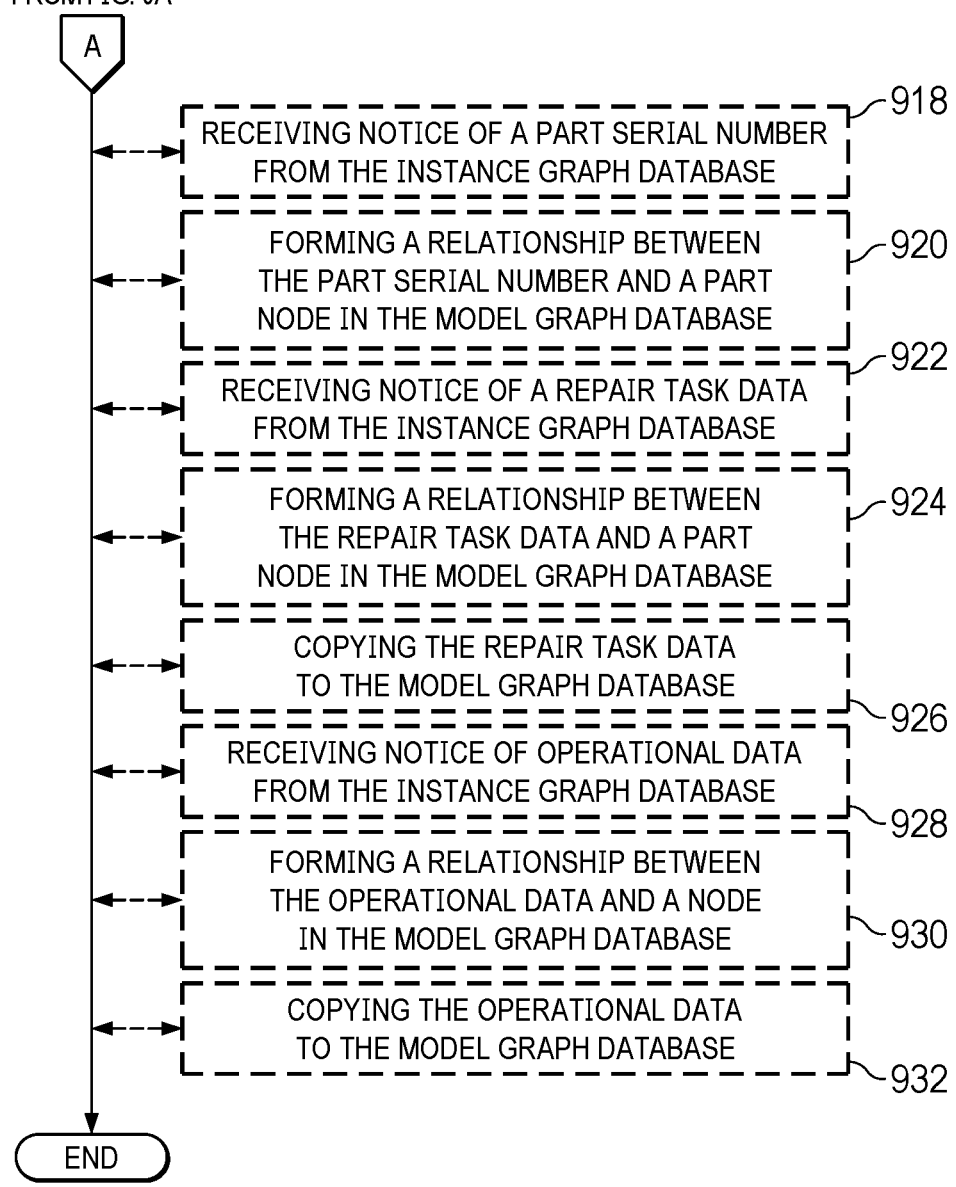

Turning now to FIGS. 9A and 9B, a flowchart of a method of managing platform data is depicted in accordance with an illustrative embodiment. Method 900 can be performed to manage data of aircraft 100 of FIG. 1. Method 900 can be performed using model graph database 246 and instance graph database 224 of FIG. 2. Method 900 can be performed using model graph database 302 and instance graph database 301 of FIG. 3. Method 900 can be performed using model graph database 402 and instance graph database 401 of FIGS. 4-8.

Method 900 forms a model graph database managed in a manufacturer environment, the model graph database comprising nodes of assemblies, sub-assemblies, and parts for a designed configuration of a model of the platform (operation 902). In some illustrative examples, the model graph database is formed during the design phase of the platform. The model graph database contains the variations of the model. The model graph database is managed by the manufacturer and is updated as needed to include instructions, alerts, or alternative parts.

Method 900 forms an instance graph database to be managed in a customer environment, the instance graph database comprising nodes of assemblies, sub-assemblies, and parts for a real-time configuration of the platform (operation 904). The instance graph database includes the part serial numbers and other data specific to the platform. When instance graph database is first generated, the instance graph database will be generated by the manufacturer with the information specific to the build of the platform. The instance graph database is intended to maintain the real-time configuration for the platform. Upon delivery of the platform to the customer, the instance graph database will be provided to the customer (operator) for their use.

Method 900 forms a plurality of relationships between the nodes of the model graph database and the nodes of the instance graph database to form a coupled graph database pair (operation 906). The plurality of relationships provides the ability to quickly and easily transfer information specific to specific subassemblies, assemblies, or parts for the platform. By providing the plurality of relationships, the model graph database 246 can receive updated data during operation of the platform without undesirable amounts time or expense. By providing plurality of relationships, the instance graph database can receive alerts, bulletins, instructions, or other information without undesirable amounts of time or expense. Afterwards, method 900 terminates.

In some illustrative examples, method 900 identifies a service bulletin to be relationally associated with at least one of the nodes of the instance graph database (operation 908). In some illustrative examples, method 900 identifies a number of nodes of the instance graph database to be associated with the service bulletin (operation 910). In some illustrative examples, method 900 links the service bulletin to the number of nodes of the instance graph database to form relationships between the service bulletin and the number of nodes (operation 912). In some illustrative examples, identifying the number of nodes of the instance graph database to be associated with the service bulletin comprises identifying at least one of the nodes of the model graph database relationally connected to the service bulletin (operation 912). 914

In some illustrative examples, method 900 generates relationships between replacement part model numbers and a part in the model graph database, wherein the replacement part model numbers are alternative parts identified as acceptable replacements for the part (operation 916).

In some illustrative examples, method 900 receives notice of a part serial number from the instance graph database (operation 918). In some illustrative examples, method 900 forms a relationship between the part serial number and a part node in the model graph database (operation 920).

In some illustrative examples, method 900 receives notice of a repair task data from the instance graph database (operation 922). In some illustrative examples, method 900 forms a relationship between the repair task data and a part node in the model graph database (operation 924). In some illustrative examples, method 900 copies the repair task data to the model graph database (operation 926). Although the repair task data could be accessed by traversing the relationships between the two graph databases, the manufacturer may wish to have the operational data saved within a manufacturer-maintained system to perform analyses. The manufacturer can perform analyses of repair task data to develop new designs, new repair methods, or designs for future platforms.

In some illustrative examples, method 900 receives notice of operational data from the instance graph database (operation 928). In some illustrative examples, method 900 forms a relationship between the operational data and a node in the model graph database (operation 930). In some illustrative examples, method 900 copies the operational data to the model graph database (operation 932). Although the operational data could be accessed by traversing the relationships between the two graph databases, the manufacturer may wish to have the operational data saved within a manufacturer-maintained system to perform analyses. The manufacturer can perform analyses of operational data to develop new designs, new repair methods, or designs for future platforms.

Figure 10:
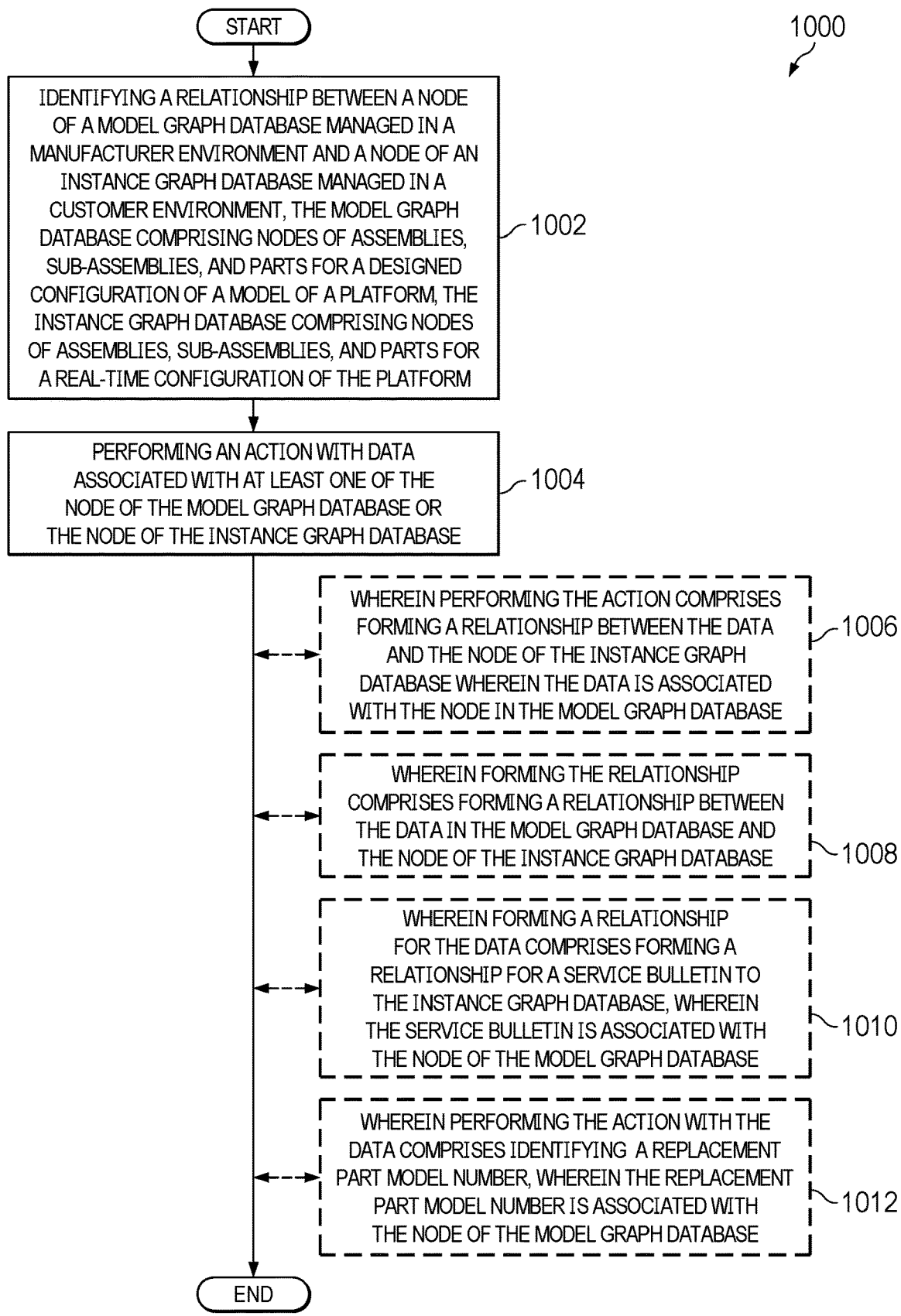
FIG. 10 is a flowchart of a method of managing platform data in accordance with an illustrative embodiment.

Turning now to FIG. 10, a flowchart of a method of managing platform data is depicted in accordance with an illustrative embodiment. Method 1000 can be performed to manage data of aircraft 100 of FIG. 1. Method 1000 can be performed using model graph database 246 and instance graph database 224 of FIG. 2. Method 1000 can be performed using model graph database 302 and instance graph database 301 of FIG. 3. Method 1000 can be performed using model graph database 402 and instance graph database 401 of FIGS. 4-8.

Method 1000 identifies a relationship between a node of a model graph database managed in a manufacturer environment and a node of an instance graph database managed in a customer environment, the model graph database comprising nodes of assemblies, sub-assemblies, and parts for a designed configuration of a model of a platform, the instance graph database comprising nodes of assemblies, sub-assemblies, and parts for a real-time configuration of the platform (operation 1002). Method 1000 performs an action with data associated with at least one of the node of the model graph database or the node of the instance graph database (operation 1004). Afterwards, method 1000 terminates.

In some illustrative examples, performing the action comprises forming a relationship between the data and the node of the instance graph database wherein the data is associated with the node in the model graph database (operation 1006). In some illustrative examples, forming the relationship comprises forming a relationship between the data in the model graph database and the node of the instance graph database (operation 1008). In some illustrative examples, forming a relationship for the data comprises forming a relationship for a service bulletin to the instance graph database, wherein the service bulletin is associated with the node of the model graph database (operation 1010). In some illustrative examples, performing the action with the data comprises identifying a replacement part model number, wherein the replacement part model number is associated with the node of the model graph database (operation 1012).

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, any of operation 908 through operation 932 may be optional. As another example, any of operation 1006 through operation 1012 may be optional.

Figure 11:
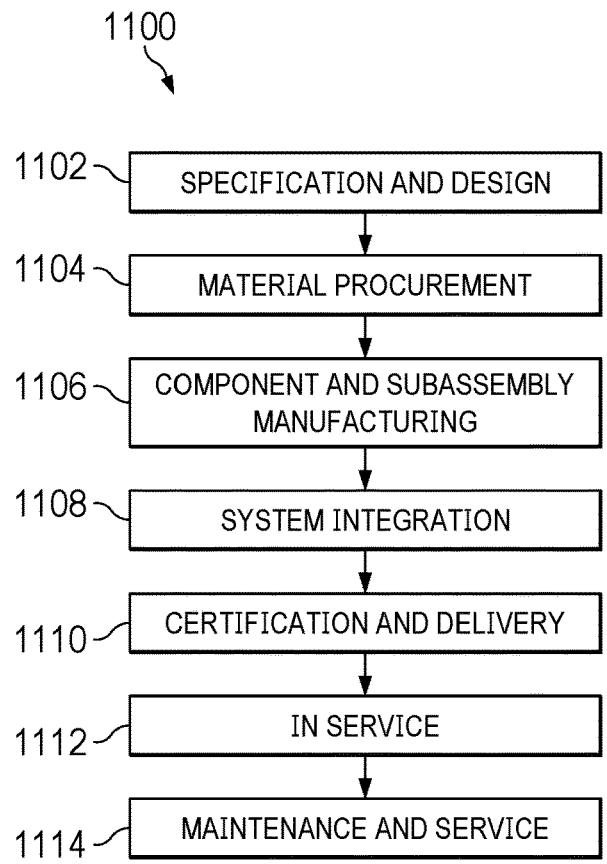
FIG. 11 is an illustration of an aircraft manufacturing and service method in a form of a block diagram in accordance with an illustrative embodiment.
Figure 12:
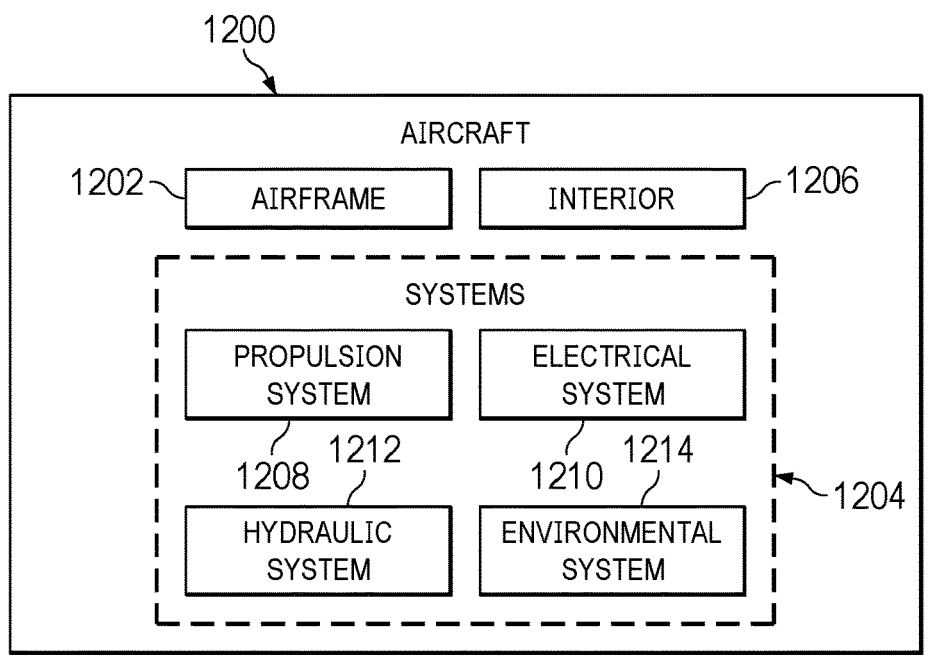
FIG. 12 is an illustration of an aircraft in a form of a block diagram in which an illustrative embodiment may be implemented.

Illustrative embodiments of the present disclosure may be described in the context of aircraft manufacturing and service method 1100 as shown in FIG. 11 and aircraft 1200 as shown in FIG. 12. Turning first to FIG. 11, an illustration of an aircraft manufacturing and service method is depicted in accordance with an illustrative embodiment. During pre-production, aircraft manufacturing and service method 1100 may include specification and design 1102 of aircraft 1200 in FIG. 12 and material procurement 1104.

During production, component and subassembly manufacturing 1106 and system integration 1108 of aircraft 1200 takes place. Thereafter, aircraft 1200 may go through certification and delivery 1110 in order to be placed in service 1112. While in service 1112 by a customer, aircraft 1200 is scheduled for routine maintenance and service 1114, which may include modification, reconfiguration, refurbishment, or other maintenance and service.

Each of the processes of aircraft manufacturing and service method 1100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 12, an illustration of an aircraft is depicted in which an illustrative embodiment may be implemented. In this example, aircraft 1200 is produced by aircraft manufacturing and service method 1100 of FIG. 11 and may include airframe 1202 with plurality of systems 1204 and interior 1206. Examples of systems 1204 include one or more of propulsion system 1208, electrical system 1210, hydraulic system 1212, and environmental system 1214. Any number of other systems may be included.

Apparatuses and methods embodied herein may be employed during at least one of the stages of aircraft manufacturing and service method 1100. One or more illustrative embodiments may be manufactured or used during at least one of component and subassembly manufacturing 1106, system integration 1108, in service 1112, or maintenance and service 1114 of FIG. 11.

For example, instance graph database 224 and model graph database 246 can be used to manage data of aircraft 1200 during any and all of component and subassembly manufacturing 1106, system integration 1108, in service 1112, or maintenance and service 1114 of FIG. 11. Aircraft 1200 is an example of a platform, such as platform 206 in FIG. 2. Method 900 or Method 1000 could be performed during any of component and subassembly manufacturing 1106, system integration 1108, in service 1112, or maintenance and service 1114 of FIG. 11. Method 900 or Method 1000 could be performed for aircraft 1200.

The illustrative examples provide a coupled graph database pair configured to reduce at least one of the time, cost, or effort of maintaining documentation for a platform, such as an aircraft. The illustrative examples also provide at least one of reduced time, cost, or effort in receiving information regarding at least one of acceptable replacement parts, a service bulletin, or other part specific information.

A model graph and a tail graph are used as a framework to enable the creation of the digital twin of an individual aircraft. The approach to model graphs using the physical structure and logical structure of an aircraft is a novel aspect of the illustrative examples.

The graph databases are used in the illustrative examples to implement a framework for data management.

The separation of a model graph and a tail graph provides technical advantages. The separation of the model graph and the tail (instance) graph enables both the manufacturer and the operator (customer) to contribute data and interlink data elements.

The illustrative examples can be used extensively to collect and link aircraft data from various sources both inside and outside of a single entity. The illustrative examples can be used extensively to collect and link aircraft data from various sources both inside and outside of a single company. The illustrative examples can provide a hub to drive data sharing and the foundation of new applications and integrations between manufacturers and customers.

The framework of the illustrative examples allows a mechanism through which Operators/Customers can share information/data with a manufacturer. The illustrative examples also provide a significantly more efficient mechanism than paper documents for a manufacturer to share information/data with operators. The illustrative examples also reduce the cost and increase the speed with which design and part updates can be delivered to customers.

The illustrative examples provide a system and method to create a digital twin of an aircraft using linked graph databases to model both the aircraft as designed and the aircraft as flown are presented. The illustrative examples create a central framework by which all of the operational data associated with either the model or the specific tail can be related and linked through its life. The illustrative examples provide a mechanism through with the different participants in the operational life of the aircraft can create and link new data so that it can be easily found and used by other stakeholders.

The illustrative examples provide envisions a framework of two types of graphs: a model graph and a tail graph. The model graph represents the as-designed aircraft (e.g., a model). The tail graph represents the instances of an aircraft model. Every tail has a unique tail graph. Every model of aircraft has a unique model graph. The manufacturer has control and write/update access to the model graph. The operator (e.g., an airline) has control and write/update access to the tail graph.

The illustrative examples the model graph represents the entire logical structure of the aircraft through a hierarchical breakdown of the assemblies, sub-assemblies and parts (initially with the part numbers associated with the as-delivered aircraft). In a graph database these would be represented as Nodes. Updates to the design (e.g., changing part numbers) are maintained in the model graph and can be initiated through service bulletins or airworthiness directives.

The digital twin of an aircraft is modeled through two graph ontologies. The first is a graph representing the aircraft model (model graph), as a hierarchy of positions into which assemblies and parts are installed. The second is a graph of a specific aircraft tail (tail graph) reflecting the as-flying configuration of an airplane represented by its installed serialized parts. Links between the two graphs are used to model relationships between the model and the tails. This aircraft ontology provides a framework through which all data can be linked to create a complete aircraft digital twin.

The illustrative examples provide a framework that allows the manufacturer to deliver the information necessary for an aircraft in the form of data that is linked to a digital twin of the aircraft and for Operators/MROs to deliver tail updates into the same framework. The Operator and MRO contribute operational data that is linked in the graph digital twin, and the manufacturer does the same through its regular revision cycle. The aircraft graph model acts as the hub of operational data and information, and it does this by representing the aircraft as an ontology instantiated with a graph database.

Links are established between the model and tail graphs to reflect various relationship such as: —A specific serialized part has been installed to replace the original OEM part—A service bulletin was implemented on a serialized part or assembly—A serialized part is an instance of a part model—A tail is an instance of an aircraft model These relationships are modeled as Edges in a graph databases.

Creating two graphs to represent the digital twin of an aircraft allows both the designed and as-flying configuration of the aircraft to be modeled. It also provides the framework on which many other pieces of data can be attached over time. For example: —Repair description can be linked to the specific part (node) of the aircraft—Data associated with a flight can be linked to the aircraft (node)—Data associated with a design change can be linked to a particular part number—Operator (nodes) can be linked to an aircraft as it changes ownership.

The illustrative examples provide a significant step reduction and can result in massive savings of resources for operator for the practical application of maintenance, parts replacement, and other operational steps for aircraft. The illustrative examples provide increased accuracy over manual translation of physical and digital documents. The illustrative examples provide Realtime communication between databases of two organizations. The illustrative examples provide real—time updating of databases—access to data from operator—updating edges.

The illustrative examples provide a representation of a digital twin of the aircraft where various stakeholders can place, relate and access information/data that are of interest to multiple parties. The illustrative examples create a central framework by which all of the operational data associated with either the model or the specific tail can be related and linked through its life. The illustrative examples provide a mechanism through with the different participants in the operational life of the aircraft can create and link new data so that it can be easily found and used by other stakeholders.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer system comprising a processor and memory comprising: a coupled graph database pair configured to manage a platform, wherein the coupled graph database pair comprises:
a model graph database managed in a manufacturer environment, wherein the model graph database comprises a hierarchical breakdown of nodes in the model graph database that comprise: model assemblies, model sub-assemblies, and model parts, that represent a physical structure and a logical structure of an entirety of the platform for a designed configuration of a model of the platform and
an instance graph database managed in a customer environment, wherein the instance graph database comprises an ontology that forms a framework that couples nodes in the instance graph database that comprise: instance assemblies, instance sub-assemblies, and instance parts, for a real-time configuration of the platform through a plurality of relationships formed as edges with the nodes of the model graph database, wherein the ontology is configured to add data into: the instance assemblies, the instance sub-assemblies, and the instance parts, that differentiates: the instance assemblies, the instance sub-assemblies, from the model assemblies, the model sub-assemblies, and the model parts, without a need to recompile software or rebuild the plurality of relationships between nodes of the instance graph database or the model graph database.

2. The computer system of claim 1, wherein:
the instance graph database is based upon an illustrated parts catalog and comprises a serial number of an installed part;
the instance graph database is smaller than the model graph database; and
the relationships provide access to the hierarchical breakdown of the model graph database utilized in traversals of the coupled graph database pair.

3. The computer system of claim 2, wherein:
the coupled graph database pair are further structured to accept:
new relationships devoid of a recompilation requirement; and
changes, at a run-time, to a data schema for any of the nodes or the edges; and
the plurality of relationships comprises a relationship between the serial number of the installed part and specifications of a part for the model of the platform.

4. The computer system of claim 3, wherein the model graph database further comprises replacement part model numbers with relationships to the part, wherein the replacement part model numbers are alternative parts identified as acceptable replacements for the part.

5. The computer system of claim 3, wherein the model graph database further comprises a number of repair tasks with relationships to the part.

6. The computer system of claim 1, wherein:
the nodes of the model graph database and the instance graph database are formed based on an illustrated parts catalog for the platform; and
relationships between the nodes of the instance graph database are not based on the integrated parts catalog.

7. The computer system of claim 1, wherein the model graph database further comprises a plurality of model relationships between the nodes of the model graph database.

8. The computer system of claim 7, wherein the instance graph database further comprises a plurality of instance relationships between the nodes of the instance graph database, and wherein the plurality of model relationships and the plurality of instance relationships are equal.

9. A computer system comprising a processor and memory comprising: a model graph database managed in a manufacturer environment, wherein the model graph database comprises:
a hierarchical breakdown of nodes that comprise: assemblies, sub-assemblies, and parts, that represent a physical structure and a logical structure of an entirety of a platform in a model of a platform;

a plurality of model relationships between the nodes; and a plurality of relationships formed as edges between the nodes and a plurality of nonhierarchical formatted nodes of an instance graph database managed in a customer environment, wherein the nodes of the instance graph database represent a real-time configuration of the platform in a format that couples nodes of the instance graph database to the hierarchical breakdown of the nodes of the model graph database configured to store and search data as graphed yet deliver data in a linear format, wherein the nonhierarchical formatted nodes of an instance graph database are configured to add data into: the instance graph database that differentiates: instance assemblies, instance sub-assemblies from the assemblies, the sub-assemblies, and the parts, without a need to recompile software or rebuild the plurality of model relationships between nodes of the instance graph database or the model graph database.

10. The computer system of claim 9, further comprising:
a number of repair tasks relationally associated with a number of nodes of the nodes of assemblies, sub-assemblies, and parts.

11. The computer system of claim 9, further comprising:
a number of service bulletins relationally associated with a number of nodes of the nodes of assemblies, sub-assemblies, and parts.

12. The computer system of claim 9, further comprising:
operational data from an instance of the platform, the operational data relationally associated with a number of nodes of the nodes of assemblies, sub-assemblies, and parts; and the plurality of relationships formatted to:
provide a same amount of data faster than from a linear formatted database; and
to respond to a query without a need to flip between sections of manuals.

13. The computer system of claim 9, further comprising:
nodes of the instance graph database formatted based upon an illustrated parts catalog;
relationships between the nodes of the instance graph database are not based on the integrated parts catalog; and
replacement model numbers of a part comprising relationships to the part, wherein the replacement part model numbers are alternative parts identified as acceptable replacements for the part.

14. A computer-implemented method of managing platform data, the method comprising:
forming a model graph database managed in a manufacturer environment, the model graph database comprising a hierarchical breakdown of nodes of the model graph database comprising: model assemblies, model sub-assemblies, and model parts, that represent a physical structure and a logical structure of an entirety of a platform for a designed configuration of a model of the platform; and forming an instance graph database to be managed in a customer environment, the instance graph database in a framework coupling nodes of the instance graph database comprising: instance assemblies, instance sub-assemblies, and instance parts for a real-time configuration of the platform through a plurality of relationships formed as edges with the nodes of the model graph database, wherein the ontology is configured to add data into: the instance assemblies, the instance sub-assemblies, and the instance parts, that differentiates: the instance assemblies, the instance sub-assemblies, from the model assemblies, the model sub-assemblies, and the model parts, without a need to recompile software or rebuild the plurality of model relationships between nodes of the instance graph database or the model graph database.

15. The method of claim 14, further comprising:
identifying a service bulletin to be relationally associated with at least one of the nodes of the instance graph database;
identifying a number of nodes of the instance graph database to be associated with the service bulletin; and
linking the service bulletin to the number of nodes of the instance graph database to form relationships between the service bulletin and the number of nodes.

16. The method of claim 15 wherein identifying the number of nodes of the instance graph database to be associated with the service bulletin comprises identifying at least one of the nodes of the model graph database relationally connected to the service bulletin.

17. The method of claim 14 further comprising:
generating relationships between replacement part model numbers and a part in the model graph database, wherein the replacement part model numbers are alternative parts identified as acceptable replacements for the part.

18. The method of claim 14 further comprising:
receiving notice of a part serial number from the instance graph database; and
forming a relationship between the part serial number and a part node in the model graph database.

19. The method of claim 14 further comprising:
receiving notice of a repair task data from the instance graph database; and
forming a relationship between the repair task data and a part node in the model graph database.

20. The method of claim 19 further compromising:
copying the repair task data to the model graph database.

21. The method of claim 14 further comprising:
receiving notice of operational data from the instance graph database; and
forming a relationship between the operational data and a node in the model graph database.

22. The method of claim 21 further compromising:
copying the operational data to the model graph database.

23. A computer-implemented method of managing platform data, the method comprising:
identifying a relationship between a node of a model graph database managed in a manufacturer environment and a node of an instance graph database managed in a customer environment, the model graph database comprising a hierarchical breakdown of nodes of the model graph database of: model assemblies, model sub-assemblies, and model parts, representing a physical structure and a logical structure of an entirety of a platform for a designed configuration of a model of the platform, coupled through a plurality of relationships formed as edges to the instance graph database comprising non-hierarchical formatted nodes of the instance graph database of: instance assemblies, instance sub-assemblies, and instance parts for a real-time configuration of the platform, wherein the instance graph database is configured to add data into: the instance assemblies, the instance sub-assemblies, and the instance parts, that differentiates: the instance assemblies, the instance sub-assemblies, from the model assemblies, the model sub-assemblies, and the model parts, without a need to recompile software or rebuild the plurality of relationships between nodes of the instance graph database or the model graph database; and performing an action with data associated with at least one of the node of the model graph database or the node of the instance graph database.

24. The method of claim 23, wherein performing the action comprises:

storing and traversing the data graphically and presenting the data linearly.

25. The method of claim 24, further comprising traversing data in the instance graph database using the hierarchical breakdown of the model graph database.

26. The method of claim 25, wherein forming a relationship for the data comprises forming a relationship for a service bulletin to the instance graph database, wherein the service bulletin is associated with the node of the model graph database.

27. The method of claim 23, wherein performing the action with the data comprises accelerating identifying a replacement part model number associated with the node of the model graph database via traversing the plurality of relationships.

* * * * *